US009886799B2

(12) United States Patent
Kwak (10) Patent No.: US 9,886,799 B2
(45) Date of Patent: Feb. 6, 2018

(54) REAL-TIME CARGO CONDITION MANAGEMENT SYSTEM AND METHOD BASED ON REMOTE REAL-TIME VEHICLE OBD MONITORING

(71) Applicant: TrueLite Trace, Inc., Cupertino, CA (US)

(72) Inventor: Sung Bok Kwak, Cupertino, CA (US)

(73) Assignee: Truelite Trace, Inc., Milpitas, CA (US)

( * ) Notice: Subject to any disclaimer, the term of this patent is extended or adjusted under 35 U.S.C. 154(b) by 93 days.

(21) Appl. No.: 14/550,990

(22) Filed: Nov. 22, 2014

(65) Prior Publication Data

US 2016/0148440 A1    May 26, 2016

(51) Int. Cl.
*G07C 5/08*    (2006.01)
*G07C 5/00*    (2006.01)
*G06Q 10/08*    (2012.01)

(52) U.S. Cl.
CPC .............. *G07C 5/008* (2013.01); *G07C 5/085* (2013.01); *G06Q 10/0831* (2013.01)

(58) Field of Classification Search
None
See application file for complete search history.

(56) References Cited

U.S. PATENT DOCUMENTS

| | | |
|---|---|---|
| 7,394,381 B2 | 7/2008 | Hanson et al. |
| 7,639,140 B2 | 12/2009 | Shah |
| 7,986,238 B2 | 7/2011 | Cho |
| 2006/0200560 A1 | 9/2006 | Waugh et al. |
| 2009/0146815 A1* | 6/2009 | Cho ........................ G06Q 10/08 340/572.1 |
| 2009/0326808 A1 | 12/2009 | Blanton et al. |
| 2014/0047347 A1* | 2/2014 | Mohn ...................... G08G 1/00 715/738 |

* cited by examiner

*Primary Examiner* — Rami Khatib
*Assistant Examiner* — Gerrad A Foster
(74) *Attorney, Agent, or Firm* — Invent Capture, LLC.; Samuel S. Cho (57) ABSTRACT

A novel real-time cargo condition management system and a related method of operation utilizes a unique data synchronization between a remote real-time vehicle on-board diagnostics (OBD) monitoring architecture and a radio frequency identification (RFID) tag attached to a cargo container to track real-time conditions of the cargo container. For example, the cargo container's currently-experienced acceleration and interior temperature can be accurately tracked by a remote monitoring station through a unique data synchronization among a vehicle OBD unit in a truck, an RFID reader installed in the cargo holding area of the truck that periodically scans the RFID tag attached to the cargo container, and an OBD data transceiver unit that wirelessly transmits vehicle OBD data correlated to the RFID tag attached to the cargo container. Similarly, the cargo container's location can be accurately tracked by synchronizing the RFID tag information to the OBD data transceiver unit.

10 Claims, 5 Drawing Sheets

FIG. 1

A System Block Diagram Example for a Cargo Condition Analytics Module

An Example of an RFID-Tagged Cargo Item Communicating with an RFID Reader in a Cargo Space of a Commercial Vehicle

| Cargo Tag ID /401 | Cargo Owner Information /403 | Real-Time Cargo Condition Information /405 | Real-Time Cargo Location Information /407 | Cargo Content Info /409 |
|---|---|---|---|---|
| Sample Entry | Name, Address, and etc. | Cargo Condition Sensed by Cargo Space Sensors and Vehicle OBD Unit | Origin, Dest., Current, GPS Coordinates, etc. | Misc. |
| C8651 | Fast Fruit Express<br>2091 Skyview St.<br>Sacramento, CA, USA<br>Tel: (XXX)XXX-XXXX | 1. Current Humidity, Temperature, & History<br>2. Current Cargo G-Force & G-Force History<br>3. Current Cargo Space and/or Vehicle ID | 1. Origin: Sacramento, CA<br>2. Dest: Denver, CO.<br>3. Current Location<br>4. GPS Coordinates & History | Contains Strawberries & Bananas |
| A2087 | Fresh Milk Co.<br>3821 Dairy Drive<br>Santa Rosa, CA<br>Tel: (XXX)XXX-XXXX | 1. Current Humidity, Temperature, & History<br>2. Current Cargo G-Force & G-Force History<br>3. Current Cargo Space and/or Vehicle ID | 1. Origin: Santa Rosa, CA<br>2. Dest: El Paso, TX<br>3. Current Location<br>4. GPS Coordinates & History | Contains Milk Cartons |
| B1041 | John Schultz<br>123 Music Ave<br>Santa Cruz, CA, USA<br>Tel: (XXX)XXX-XXXX | 1. Current Humidity, Temperature, & History<br>2. Current Cargo G-Force & G-Force History<br>3. Current Cargo Space and/or Vehicle ID | 1. Origin: Santa Cruz, CA<br>2. Dest: New York, NY<br>3. Current Location<br>4. GPS Coordinates & History | Contains Fragile Wooden Music Instruments |

Information Stored in a Cargo Information Database (e.g. 129 of FIG. 1) and/or RFID Tag(s) Attached to a Cargo Item

Internal Components of a Cargo Condition Analytics Unit

REAL-TIME CARGO CONDITION MANAGEMENT SYSTEM AND METHOD BASED ON REMOTE REAL-TIME VEHICLE OBD MONITORING

BACKGROUND OF THE INVENTION

The present invention generally relates to cargo transport condition information tracking, communication, and management. More specifically, various embodiments of the present invention relate to a real-time cargo condition management system and a related method of operation with remote real-time vehicle on-board diagnostics (OBD) monitoring.

Conventional cargo transport tracking methods typically involve periodic barcode scanning or RFID tag readings at various transportation hubs between an origination address and a destination address. For example, a package may have an attached barcode sticker, which is scanned at an initial point of reception (e.g. a delivery company store), one or more delivery company transportation hubs (e.g. centralized package processing facilities, airports, or other transport facilities during transit), delivery trucks, and at a final delivery point (e.g. a customer delivery address). In the conventional cargo transport tracking method, a delivery company personnel or a customer is able to enter a tracking number in a computer-networked user interface to check a current progress of the package correlated to the tracking number.

The information provided by the "current progress" in the conventional cargo transport tracking method is inherently limited to a location history and a timestamp for the barcode scan or the RFID tag reading. Conventional cargo transport tracking methods do not provide any sensory or environmental details related to real-time cargo conditions during transit. For example, if a customer wants to track or investigate why a supposedly-fresh box of strawberries was delivered rotten and squished, the conventional cargo transport tracking method fails to provide abilities to investigate and track the cause of the problem. The lack of problem source tracking in the conventional cargo transport tracking method may unnecessarily drive up shipping insurance costs, while reducing chances of eliminating repeat package content damage problems.

Therefore, it may be desirable to devise a novel electronic system that enables real-time cargo transport condition tracking, communication, and management to capture and provide a detailed record of past and current transport conditions beyond a mere location tracking capability. Furthermore, it may also be desirable to devise this novel electronic system to be synchronized with a vehicle's on-board diagnostics (OBD) unit to correlate the vehicle's various sensory outputs to a package inside the vehicle's cargo space to provide sensory and/or environmental details for cargo transport conditions.

Moreover, it may be also desirable to add environmental sensors inside or near the vehicle's cargo space to provide other useful sensory details associated with the package in transit. In addition, it may also be desirable to provide a remote real-time vehicle OBD monitoring conducted by a delivery company or another third party to minimize package content damages during the vehicle transport.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a cargo condition management system with a remote real-time vehicle on-board diagnostics monitoring is disclosed. This cargo condition management system comprises: a vehicle on-board diagnostics unit connected to an engine control unit or a vehicular control chipset of a vehicle to record, diagnose, and generate vehicle speed data, acceleration and deceleration data, ambient air temperature data, and other vehicle diagnostics data as a real-time data stream; a cargo space radio frequency identification (RFID) reader in the vehicle with an radio frequency (RF) antenna configured to read cargo-related data from or write the cargo-related data to an RFID tag attached to a cargo item in a commercial vehicle cargo space; a cargo condition analytics module operatively connected to the vehicle on-board diagnostics unit and the cargo space RFID reader, wherein the cargo condition analytics module receives the real-time data stream from the vehicle on-board diagnostics unit and the cargo-related data from the cargo space RFID reader in the commercial vehicle cargo space; a cargo information database that accumulates and categorizes the cargo-related data and cargo transport condition-related data from the cargo condition analytics module by cargo tag identification (ID), wherein the cargo transport condition-related data includes real-time cargo transport condition parameters derived from the vehicle speed data, the vehicle acceleration and deceleration data, and the ambient air temperature data of the vehicle on-board diagnostics unit; and a computer server or another electronic device with a CPU and a memory unit that executes a cargo condition analytics unit of the cargo condition analytics module to monitor a safety level limit of the cargo item in the commercial vehicle cargo space in real time, and to generate a cargo endangerment alert to a vehicle monitoring personnel when the real-time cargo transport condition parameters derived from the vehicle acceleration and deceleration data and the ambient air temperature data exceed a cargo item endangerment threshold alert level.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more real-time cargo condition management system and a related method of operation based on a remote real-time vehicle OBD monitoring. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "vehicle on-board diagnostics (OBD) unit" is defined as an electronic device installed in a vehicle to collect and/or analyze a variety of vehicle-related data. In one example, the vehicle OBD unit outputs many data parameters in real-time, such as vehicle diagnostic information (e.g. engine temperature, oil level, OBD codes, and etc.), fuel consumption-related information, vehicle speed information, vehicle acceleration and deceleration information (i.e. measured in g-force or in SI units), ambient air temperature information, engine rotation-per-minute (RPM) information, vehicle location information, and other vehicle-related data. These data parameters may also be correlated to timestamps generated by an electronic clock associated with the vehicle OBD unit. In a preferred embodiment of the invention, some of these data parameters can be utilized as cargo condition-related data collected and analyzed by a vehicle-side cargo condition analytics module and/or a server-side cargo condition analytics module.

Furthermore, for the purpose of describing the invention, a term "cargo condition analytics module" is defined as an electronic sub-system, which at least comprises a cargo condition analytics unit, a data communication unit, a memory unit, and a central processing unit (CPU). In a preferred embodiment of the invention, this electronic subsystem is part of a real-time cargo condition management system with a remote real-time vehicle OBD monitoring. In the preferred embodiment of the invention, the cargo condition analytics unit may include an OBD information management module for keeping track of the vehicle's speed, g-force, and ambient temperature, a cargo space temperature and humidity sensor module, a vehicle location and location history management module, a cargo item RFID tag information management module, and an information display management module. Furthermore, the cargo condition analytics module may be implemented inside a vehicle (i.e. vehicle-side cargo condition analytics unit), inside a remote monitoring station unit connected to a computer server (i.e. server-side cargo condition analytics unit), or both.

In addition, for the purpose of describing the invention, a term "cargo condition analytics user interface" is defined as a computerized user interface with a display, which is connected to a vehicle-side or server-side cargo condition analytics module. This computerized user interface may be configured to display one or more cargo tag ID's and their related cargo transport condition parameters, such as cargo owner information, real-time cargo condition information (e.g. current and past humidity and temperature in a cargo space, current and past g-force records experienced by the cargo space, current cargo space and/or vehicle ID), real-time cargo location information (e.g. origin, destination, current location, GPS coordinates and history), and cargo content information.

Furthermore, for the purpose of describing the invention, a term "remote monitoring station unit" is defined as a vehicle fleet monitoring location for one or more commercial vehicles in operation. Examples of remote monitoring station units include, but are not limited to, a commercial vehicle operation control center, a vehicle monitoring service center, and a fleet vehicle employer's information technology (IT) control center.

In addition, for the purpose of describing the invention, a term "computer server" is defined as a physical computer system, another hardware device, a software module executed in an electronic device, or a combination thereof. For example, in context of an embodiment of the invention, a "computer server" is dedicated to executing one or more computer programs for receiving, processing, and analyzing cargo transport condition-related data from a vehicle OBD unit and cargo space environmental sensors. Based on the analysis of the cargo transport condition information, the computer server may also generate, transmit, or store messages and alerts associated with specific cargo transport conditions (e.g. excessive acceleration or deceleration, extreme humidity or temperature, improper current or past location for a cargo item, and etc.) that potentially endanger or damage the contents of an electronically-tracked cargo item. Furthermore, in one embodiment of the invention, a computer server is connected to one or more data networks, such as a local area network (LAN), a wide area network (WAN), a cellular network, and the Internet. Moreover, a computer server can be utilized by a vehicle monitoring personnel for gathering and analyzing cargo transport condition-related data by executing a cargo condition analytics unit and a cargo information database.

One aspect of the present invention is providing a novel cargo condition management system that enables real-time cargo transport condition tracking, communication, and management to capture and provide a detailed record of past and current transport conditions beyond a mere location tracking capability.

Furthermore, another aspect of the present invention is providing a novel cargo condition management system that synchronizes with a vehicle's on-board diagnostics (OBD) unit to correlate the vehicle's various sensory outputs to a package inside the vehicle's cargo space to provide sensory and/or environmental details for cargo transport conditions, such as acceleration, deceleration, location, ambient temperature data, and other vehicle OBD-outputted data.

Moreover, another aspect of the present invention is providing environmental sensors inside or near a vehicle's cargo space to supply other useful sensory details associated with a package in transit. Yet another aspect of the present invention is providing a remote real-time vehicle OBD monitoring conducted by a delivery company or another third party to minimize package content damages during the vehicle transport.

Figure 1:
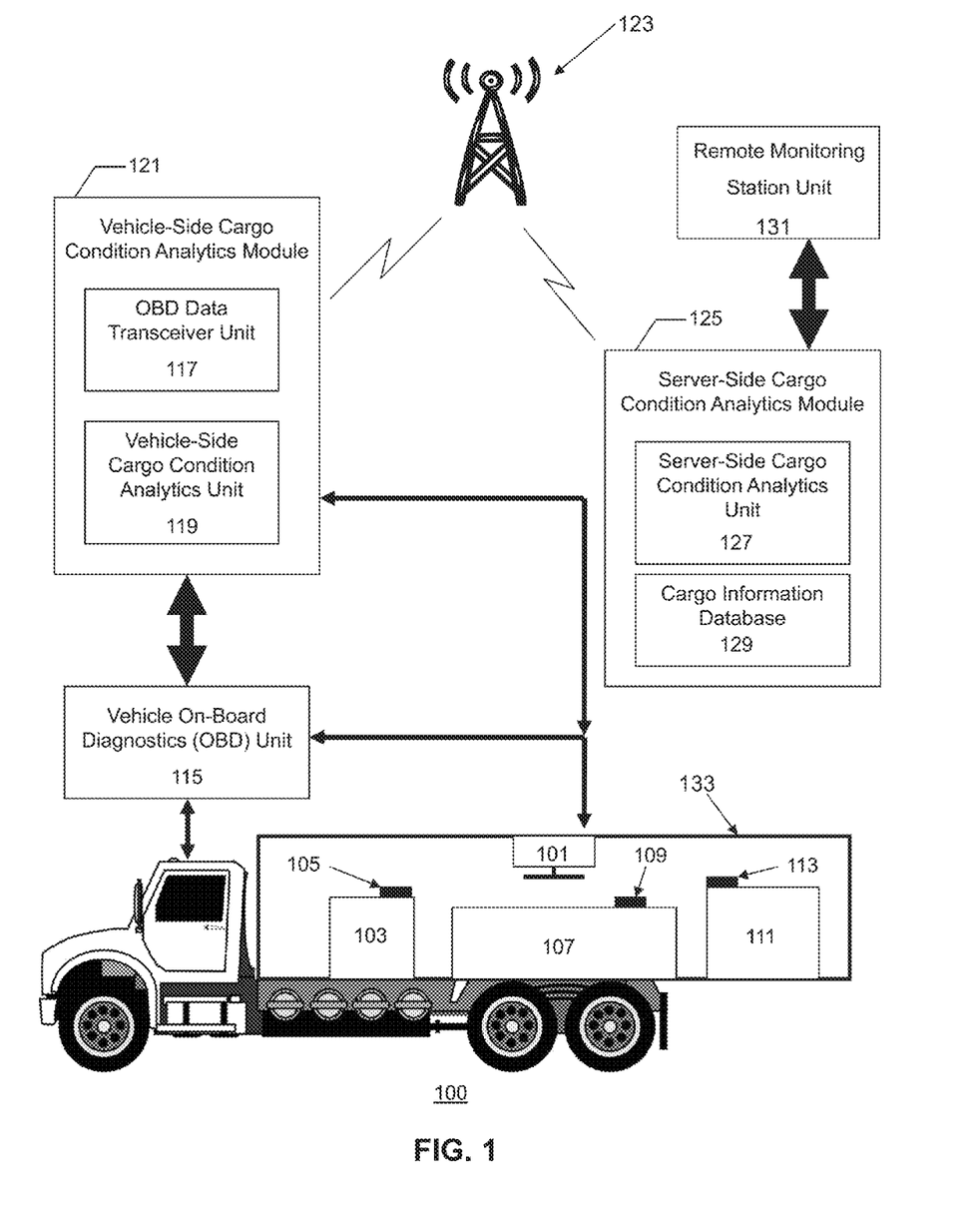
FIG. 1 shows a novel real-time cargo condition management system based on a remote real-time vehicle on-board diagnostics (OBD) monitoring, in accordance with an embodiment of the invention.

FIG. 1 shows a novel real-time cargo condition management system (100) based on a remote real-time vehicle on-board diagnostics (OBD) monitoring, in accordance with an embodiment of the invention. In a preferred embodiment of the invention, the real-time cargo condition management system (100) comprises a vehicle on-board diagnostic (OBD) unit (115) installed in a commercial vehicle, a cargo space RFID reader (101) installed inside or near a commercial vehicle cargo space (133), a cargo condition analytics module (121 and/or 125), a data communication network (123), and a remote monitoring station unit (131).

As shown in FIG. 1, the cargo condition analytics module may be on a vehicle side (i.e. 121), a server side (i.e. 125), or on both sides. In the preferred embodiment of the invention, the vehicle-side cargo condition analytics module (121) is part of an aftermarket-installed electronic device in the commercial vehicle, while the server-side cargo condition analytics module (125) is a computer software executed on a CPU and a memory unit of a computer server located in or associated with the remote monitoring station unit (131). Furthermore, as also shown in FIG. 1, the vehicle-side cargo condition analytics module (121) includes an on-board diagnostics transceiver unit (117) and a vehicle-side cargo condition analytics unit (119). Moreover, the server-side cargo condition analytics module (125) includes a server-side cargo condition analytics unit (127) and a cargo information database (129), as shown in FIG. 1. Moreover, the data communication network (123) may include at least one of a cellular communication network, a satellite communication network, a land-mobile radio communication network, or a combination thereof.

In the preferred embodiment of the invention, the vehicle OBD unit (115) is installed inside a commercial vehicle, such as a truck, a van, a taxi, or another commercial fleet vehicle. The vehicle OBD unit (115) is also typically connected to an engine control unit and other vehicular control chipsets to record, diagnose, and generate a variety of engine, vehicle dynamics, and fuel consumption data as a real-time data stream. For cargo transport condition analysis, OBD data related to vehicle dynamics for sudden acceleration and deceleration can be particularly useful for determining potentially cargo-damaging g-force loads. Furthermore, the vehicle OBD unit (115) may also generate ambient air temperature information, which can be utilized in cargo transport condition analysis. Optionally, a global positioning system (GPS) receiver or another real-time location indicator device may be integrated into or operatively connected to the vehicle OBD unit (115) to generate real-time location data for the commercial vehicle. The real-time location data of the commercial vehicle can be also utilized to determine a current and past location of a cargo item placed in the commercial vehicle cargo space (133).

Continuing with FIG. 1, in the preferred embodiment of the invention, the cargo space RFID reader (101) is connected to an RF antenna, which can read RFID tag data from a plurality of RFID tags (105, 109, 113) attached to a plurality of electronically-identifiable cargo items (103, 107, 111). The cargo space RFID reader (101) can also write electronic data into the plurality of RFID tags (105, 109, 113). In one embodiment of the invention, an RFID tag may be a standalone detachable tag, which is temporarily and removably attached to a cargo item. In another embodiment of the invention, an RFID tag may be permanently affixed to a cargo item. Furthermore, in the preferred embodiment of the invention, the cargo space RFID reader (101) is programmed to read RFID tag data from a RFID tag when a corresponding cargo item is loaded into the commercial vehicle cargo space (133). At a minimum, the RFID tag attached to the cargo item can store a cargo tag identification (ID), cargo owner information, and cargo content information. Therefore, an initial data scan of the RFID tag (105, 109, or 113) from the cargo space RFID reader (101) enables data uploading and synchronization with the cargo information database (129) in the server-side cargo condition analytics module (125) or in the vehicle-side cargo condition analytics module (121), with the cargo tag ID as a database key that can be searched and correlated in the cargo information database (129).

Once the cargo tag ID, the cargo owner information, and the cargo content information from the RFID tag are stored or synchronized in the cargo information database (129), a select number of real-time data stream from the vehicle OBD unit (115) and from environmental sensors inside or near the commercial vehicle cargo space (133) can be identified as "cargo transport condition parameters," and then associated with the cargo tag ID recognized by the vehicle-side cargo condition analytics module (121) and/or in the server-side cargo condition analytics module (125) through the data communication network (123).

In one example, the cargo transport condition parameters gathered from the vehicle OBD unit (115) include vehicle acceleration and deceleration records, ambient air temperature, real-time location information, and any vehicle diagnostics information correlated to timestamps, which may be useful for cargo transport condition analysis. Furthermore, in the same example, the cargo transport condition parameters can also include temperature and humidity readings and/or other sensory readings from environmental sensors installed inside or near the commercial vehicle cargo space (133).

Continuing with FIG. 1, in one embodiment of the invention, the vehicle-side cargo condition analytics module (121) may request and receive cargo information associated with a particular cargo tag ID from the cargo information database (129) through the data communication network (129). In one example, the particular cargo tag ID is initially fetched and identified by scanning an RFID tag (e.g. 105) attached to an electronically-identifiable cargo item (103) in the commercial vehicle cargo space (133) with the cargo space RFID reader (101). Then, the vehicle-side cargo condition analytics unit (119) associates the particular cargo tag ID with cargo transport condition parameters originating from the vehicle OBD unit (115) and from environmental sensors inside or near the commercial vehicle cargo space (133).

Subsequently, the associated dataset that includes the cargo tag ID, other pertinent information retrieved from the RFID tag, and the cargo transport condition parameters is transmitted to the server-side cargo condition analytics module (125) by the OBD data transceiver unit (117) through the data communication network. The cargo information database (129) then utilizes the cargo tag ID as a database key to store, retrieve, and/or update cargo-related and cargo transport condition-related information in the cargo information database (129). If the vehicle-side cargo condition analytics module (121) requested cargo-related and cargo transport condition-related information from the cargo information database (129), the server-side cargo condition analytics unit (127) can command the cargo information database (129) to retrieve pertinent information, and then transmit the pertinent information to the vehicle-side cargo condition analytics module (121).

In the preferred embodiment of the invention as shown in FIG. 1, the vehicle-side cargo condition analytics unit (119) and/or the server-side cargo condition analytics unit (127) may include an OBD information management module for keeping track of the vehicle's speed, g-force, and ambient temperature, a cargo space temperature and humidity sensor module, a vehicle location and location history management module, a cargo item RFID tag information management module, and an information display management module. Furthermore, the vehicle-side cargo condition analytics unit (119) and/or the server-side cargo condition analytics unit (127) are configured to monitor and analyze cargo owner information, real-time cargo condition information (e.g. current and past humidity and temperature in a cargo space, current and past g-force records experienced by the cargo space, current cargo space and/or vehicle ID), real-time cargo location information (e.g. origin, destination, current location, GPS coordinates and history), and cargo content information, in order to determine potential endangerment, loss, or damage to electronically-identifiable cargo items (e.g. 103, 107, 111) that are placed inside the commercial vehicle cargo space (133).

In addition, in the preferred embodiment of the invention a computer server may be utilized to execute the server-side cargo condition analytics module (125), including the server-side cargo condition analytics unit (127) and the cargo information database (129) for analyzing the cargo transport condition-related data from the vehicle OBD unit (115) and cargo space environmental sensors. Based on the analysis of the cargo transport condition information, the computer server may also generate, transmit, or store messages and alerts associated with specific cargo transport conditions (e.g. excessive acceleration or deceleration, extreme humidity or temperature, improper current or past location for a cargo item, and etc.) that potentially endanger or damage the contents of an electronically-tracked cargo item.

Furthermore, the computer server can be additionally utilized by a vehicle monitoring personnel through a cargo condition analytics user interface, which displays one or more cargo tag ID's and their related cargo transport condition parameters, such as cargo owner information, real-time cargo condition information (e.g. current and past humidity and temperature in a cargo space, current and past g-force records experienced by the cargo space, current cargo space and/or vehicle ID), real-time cargo location information (e.g. origin, destination, current location, GPS coordinates and history), and cargo content information. The vehicle monitoring personnel may be an employee at the remote monitoring station unit (131), which is a vehicle fleet monitoring location for one or more commercial vehicles in operation. The remote monitoring station units (131) may be a commercial vehicle operation control center, a vehicle monitoring service center, and a fleet vehicle employer's information technology (IT) control center.

Figure 2:
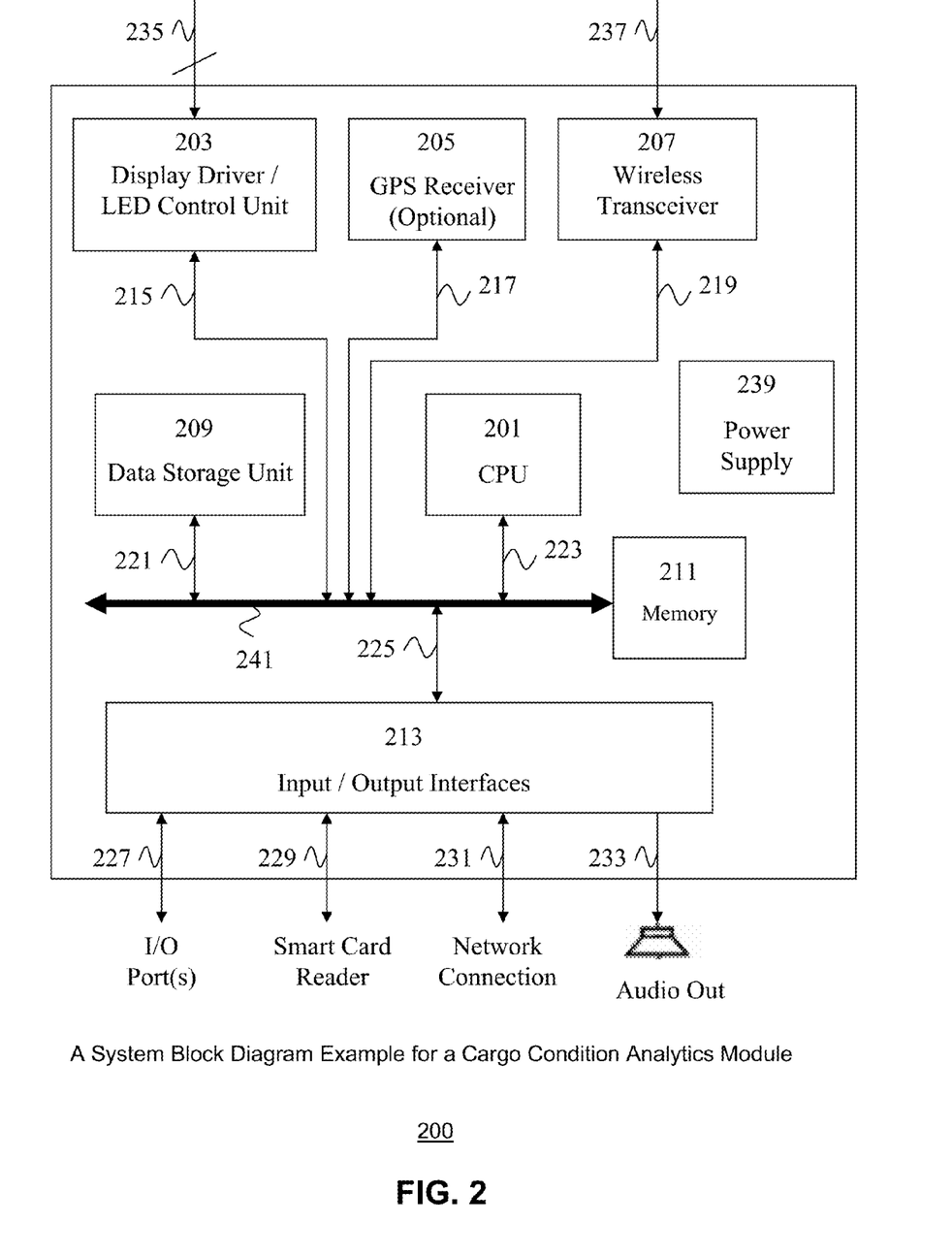
FIG. 2 shows a system block diagram example for a cargo condition analytics module, in accordance with an embodiment of the invention.

FIG. 2 shows a system block diagram example (200) for a cargo condition analytics module, in accordance with an embodiment of the invention. In this system block diagram example (200), the vehicle-side cargo condition analytics module (e.g. 121 in FIG. 1) includes a CPU (201), a memory unit (211), a data storage unit (209), a display driver and/or LED control unit (203), a wireless transceiver (207), an input/output interfaces (213), and a power supply (239). Optionally, the vehicle-side cargo condition analytics module also has a global positioning system (GPS) receiver (205).

In one embodiment of the invention, these hardware system blocks (e.g. 200) for the vehicle-side cargo condition analytics module are configured to execute a vehicle-side cargo condition analytics unit (e.g. 119 of FIG. 1) in the CPU (201) and the memory unit (211). In another embodiment of the invention, the vehicle-side cargo condition analytics unit (e.g. 119 of FIG. 1) may be hard-coded into a semiconductor chip as a hardware component within the hardware system blocks of the vehicle-side cargo condition analytics module (e.g. 121 in FIG. 1). Furthermore, the wireless transceiver (207) in the system block diagram example (200) for the vehicle-side cargo condition analytics module can function as an OBD data transceiver unit (e.g. 117 of FIG. 1), with a wireless data communication interface (237). The wireless transceiver (207) may be configured to transmit or receive data packets via a cellular network, a satellite network, a land-mobile radio network, or via another wireless communication method.

Continuing with FIG. 2, the data storage unit (209) in the vehicle-side cargo condition analytics module (e.g. 121 in FIG. 1) can store OBD data streams from a vehicle OBD unit and any information retrieved from a cargo information database (e.g. 129 in FIG. 1). Furthermore, the vehicle-side cargo condition analytics unit (e.g. 119 of FIG. 1) executed in the hardware system blocks (i.e. the CPU (201) and the memory unit (211)) of the vehicle-side cargo condition analytics module (e.g. 121 in FIG. 1) can retrieve the OBD data streams, environmental sensor readings associated with the commercial vehicle cargo space (e.g. 133 in FIG. 1), and other cargo-related and cargo transport condition-related information from the data storage unit (209) to calculate and/or determine current status of each tracked cargo item as well as any potential loss, damages, or endangerment to each tracked cargo item.

For example, excessive acceleration or deceleration of the commercial vehicle, which is detected from the OBD data streams may indicate a potential damage or endangerment to a fragile cargo item. In another example, excessively cold or hot temperature, or extreme humidity or dryness detected from the environmental sensors associated with the commercial vehicle cargo space (e.g. 133 in FIG. 1) may also indicate a potential damage or endangerment to temperature and humidity-sensitive cargo items, such as agricultural produce, dairy products, and wooden products. Yet in another example, an abrupt outage or improper GPS coordinate readings for the commercial vehicle from the GPS receiver (205) or another location tracking unit may indicate a potential loss or endangerment to the tracked cargo items that are supposedly carried in the commercial vehicle cargo space (e.g. 133 in FIG. 1).

When abnormal, dangerous, and/or improper data value readings are detected and determined by the vehicle-side cargo condition analytics module (e.g. 121 in FIG. 1) and/or by the server-side cargo condition analytics module (e.g. 125 in FIG. 1), an information display management module, which is executed by the CPU (201) and the memory unit (211), generates a cargo condition analytics user interface. In the preferred embodiment of the invention, the cargo condition analytics user interface is configured to display one or more cargo tag ID's and their related cargo transport condition parameters, such as cargo owner information, real-time cargo condition information (e.g. current and past humidity and temperature in a cargo space, current and past g-force records experienced by the cargo space, current cargo space and/or vehicle ID), real-time cargo location information (e.g. origin, destination, current location, GPS coordinates and history), and cargo content information.

The cargo condition analytics user interface may also generate textual, aural, or multimedia alerts to a vehicle monitoring personnel, based on alerts determined by the vehicle-side and/or server-side cargo condition analytics modules. Furthermore, the vehicle-side and/or server-side cargo condition analytics modules may also generate alerts or indicate monitoring statuses via a plurality of LED indicator lights connected to the display driver and/or LED control unit (203) and a display driver output (235). Moreover, various hardware components (i.e. 201, 203, 205, 207, 209, 211, 213, 239) of the vehicle-side cargo condition analytics module can transmit and receive data among each other via an internal bus (241) and various electrical connections (215, 217, 219, 221, 223, 225).

In the embodiment of the invention as shown in FIG. 2, the vehicle-side cargo condition analytics module also includes the power supply unit (239), which supplies electrical power to various hardware components (i.e. 201, 203, 205, 207, 209, 211, 213, 239) in the hardware system blocks of the vehicle-side cargo condition analytics module. Furthermore, the vehicle-side cargo condition analytics module may also include the input/output interfaces (213) that can accommodate data communication for I/O ports (227), smart card readers (229), network connections (231), and an audio out connection (233) to a speaker. As shown in the system block diagram example (200), in this embodiment of the invention, the input/output interfaces (213) are operatively connected to the internal bus (241), which can communicate with any other components in the vehicle-side cargo condition analytics module.

Figure 3:
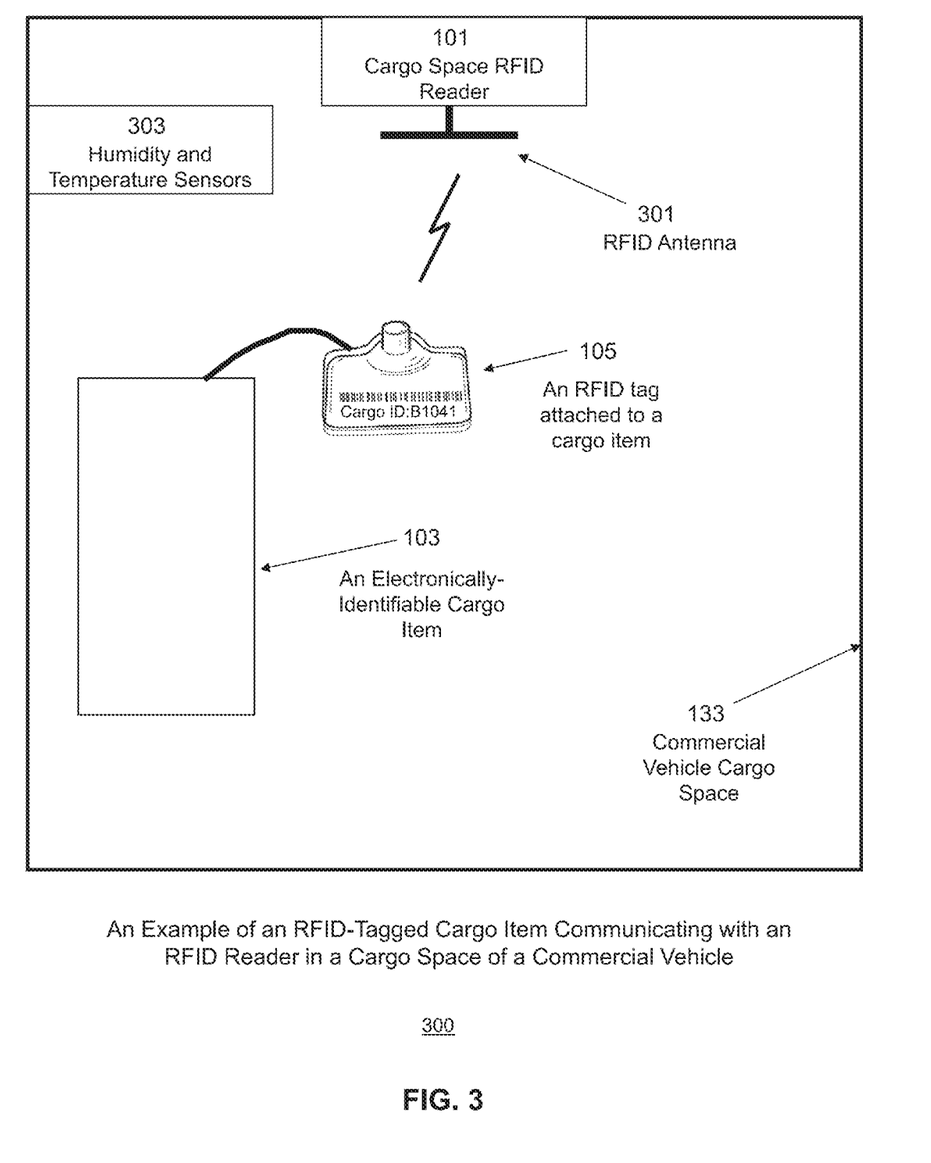
FIG. 3 shows an example of an RFID-tagged cargo item communicating with an RFID reader in a cargo space of a commercial vehicle, in accordance with an embodiment of the invention.

FIG. 3 shows an example (300) of an RFID-tagged cargo item communicating with an RFID reader in a cargo space of a commercial vehicle, in accordance with an embodiment of the invention. In this embodiment of the invention, the RFID-tagged cargo item is the electronically-identifiable cargo item (103) with the RFID tag (105), and the RFID reader is the cargo space RFID reader (101) in the commercial vehicle cargo space (133), which were previously shown and described for FIG. 1.

As shown in FIG. 3, in this embodiment of the invention, the cargo space RFID reader (101) is connected to an RFID antenna (301), which amplifies radio frequency (RF) signals for reception and transmission of RF signals between the RFID tag (105) and the cargo space RFID reader (101). In one embodiment of the invention, the RFID tag (105) and the cargo space RFID reader (101) may communicate in an ultra high frequency (UHF) range, which is defined as an operating frequency range of 860 MHz-960 MHz based on the ISO/IEC 18000-6 air interface standard. In another embodiment of the invention, the RFID tag (105) and the cargo space RFID reader (101) may communicate in a low frequency (LF) range, which is below the UHF range. Yet in another embodiment of the invention, the RFID tag (105) and the cargo space RFID reader (101) may communicate in frequency ranges outside of the UHF and LF ranges for special purpose applications.

Continuing with FIG. 3, the commercial vehicle cargo space (133) may also include humidity and temperature sensors (303) that detect current humidity and temperature inside the commercial vehicle cargo space (133). The humidity and temperature sensors (303) are environmental sensors that can be operatively connected to the vehicle OBD unit (e.g. 115 in FIG. 1) and/or the vehicle-side cargo condition analytics module (e.g. 121 in FIG. 1) in the real-time cargo condition management system (e.g. 100 in FIG. 1) for detailed real-time cargo transport condition detection and analysis. Other environmental sensors may also be installed inside or near the commercial vehicle cargo space (133), depending on the need of a specific cargo transport condition analysis application. The vehicle-side cargo condition analytics module (e.g. 121 in FIG. 1) is able to combine the various output streams from the humidity and temperature sensors (303), the RFID tag (105), and the vehicle OBD unit (e.g. 115 in FIG. 1) to record, detect, and determine current condition of the electronically-identifiable cargo item (103) as well as any potential losses, damages, or endangerment to the electronically-identifiable cargo item (103).

Furthermore, in a preferred embodiment of the invention, a plurality of cargo items can be tracked and analyzed inside the commercial vehicle cargo space (133) in real-time by the real-time cargo condition management system (e.g. 100 in FIG. 1). In addition to the analytical capability provided by the vehicle-side cargo condition analytics module (e.g. 121 in FIG. 1), the server-side cargo condition analytics module (e.g. 125 in FIG. 1) and the remote monitoring station unit (e.g. 131 in FIG. 1) can monitor and analyze cargo transport condition-related data remotely through the OBD data transceiver unit (e.g. 117 in FIG. 1) in the commercial vehicle and through the data communication network (e.g. 123 in FIG. 1).

Moreover, in one embodiment of the invention, the RFID tag (105) in FIG. 3 may be a battery-free or battery-less passive RFID tag, which operates by an electro-magnetic induction from the RFID antenna (301) for accessing and changing the non-volatile memory contents of the RFID tag (105). In another embodiment of the invention, the RFID tag (105) in FIG. 3 may be a battery-powered active RFID tag, which potentially provides a longer distance access and a more reliable communication with the cargo space RFID reader (101). Furthermore, the commercial vehicle cargo space (133) may be a cargo space of a truck, a van, a car, a trailer, a vessel, a train, an airplane, or another transport medium for physical cargo items.

Figure 4:
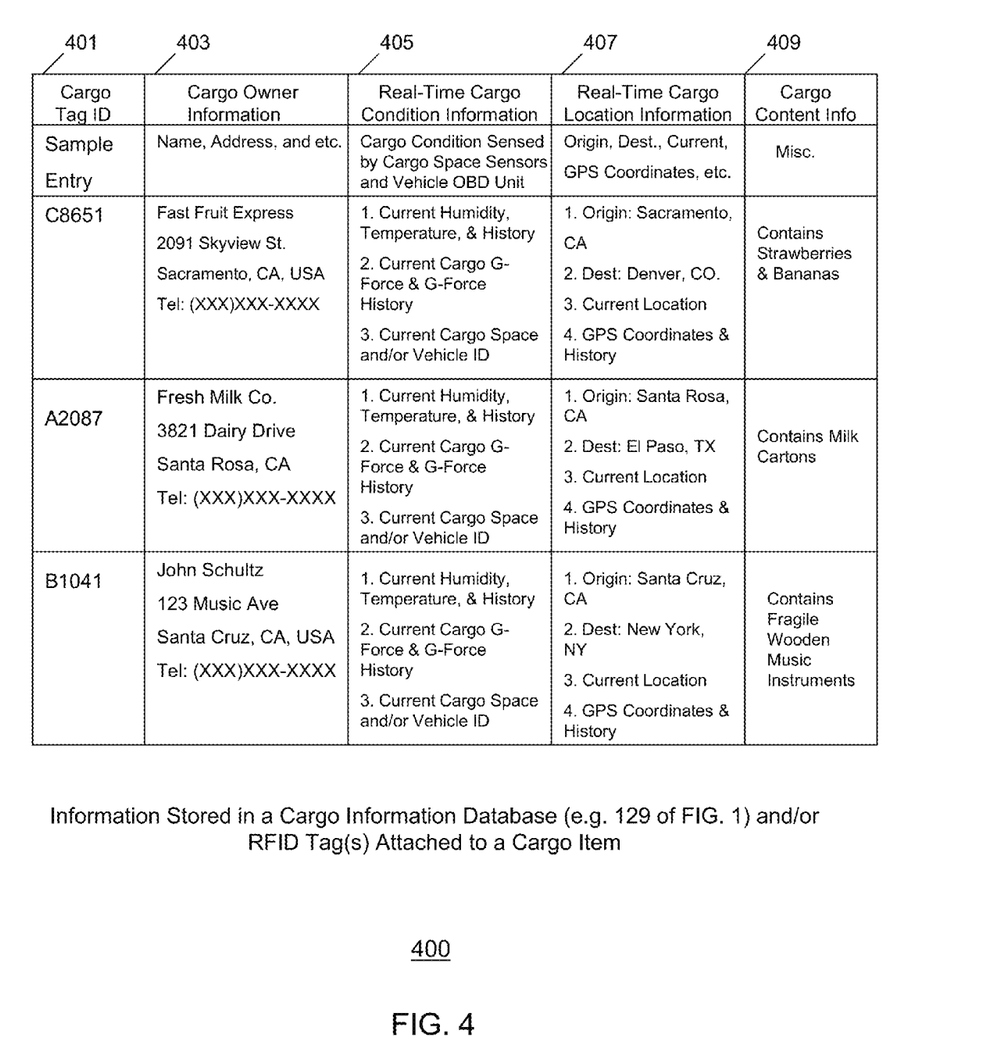
FIG. 4 shows information stored in a cargo information database and/or RFID tags attached to a cargo item, in accordance with an embodiment of the invention.

FIG. 4 shows information (400) stored in a cargo information database and/or RFID tags attached to a cargo item, in accordance with an embodiment of the invention. In this embodiment of the invention, the cargo information database gathers and stores a variety of cargo-related and cargo transport condition-related information, which are typically categorized by cargo tag ID's (401). For example, as shown in FIG. 4, for cargo items with the cargo tag ID's "C8651," "A2087," and "B1041," cargo owner information (403), real-time cargo condition information (405), real-time cargo location information (407), and cargo content information (409) are linked and associated with each cargo tag ID.

In a preferred embodiment of the invention, the cargo owner information (403) includes name, address, telephone number, and other pertinent information related to the cargo owner per cargo tag ID. Furthermore, the real-time cargo condition information (405) includes real-time cargo conditions sensed by environmental sensors in a commercial vehicle cargo space, and by vehicle onboard diagnostics (OBD) unit that outputs vehicle dynamics-related information that can be utilized to deduce cargo transport conditions. In the example as shown in FIG. 4, the real-time cargo condition information (405) specifically includes current and past records of humidity and temperature inside the commercial vehicle cargo space, which are detected by the humidity and temperature sensors inside the commercial vehicle cargo space. The real-time cargo condition information (405) also includes current and past records of cargo g-force (i.e. acceleration and deceleration) measurements, which are deduced from the output data streams of the vehicle OBD unit in the commercial vehicle. In addition, the real-time cargo condition information (405) also includes current and past records of cargo space ID's and/or vehicle ID's.

In the preferred embodiment of the invention for the information (400) stored in the cargo information database, tracking the cargo space ID's and/or vehicle ID's relative to each cargo tag ID empowers the cargo condition management system to trace and determine potential mishandling, misdelivery, or loss to a particular cargo item. In one example, if the particular cargo item represented by a cargo tag ID is being mistakenly carried by a vehicle with an incorrect or unscheduled vehicle ID and/or cargo space ID, one or more cargo condition analytics modules in the cargo condition management system can detect this potential package mishandling or misdelivery problem, and alert a cargo monitoring personnel through a cargo condition analytics user interface.

Continuing with FIG. 4, the real-time cargo location information (407) includes a cargo item's origin address, destination address, current location, GPS coordinates, and other past, scheduled, or real-time location information. The cargo condition management system is configured to track the current location of each cargo item with a corresponding cargo tag ID during transport, and any detection of potential package mishandling or misdelivery by one or more cargo condition analytics modules in the cargo condition management system can be alerted to the cargo monitoring personnel in the remote monitoring station unit to correct the potential or actual package mishandling or misdelivery.

In addition to various parameters such as the cargo owner information (403), the real-time cargo condition information (405), the real-time cargo location information (407), which are linked to the cargo tag ID (401), the information (400) stored in the cargo information database also includes the cargo content information (409). The cargo content information (409) typically includes specific details or characteristics of the contents of each cargo item. For example, the cargo item with the cargo tag ID "C8651" contains strawberries and bananas, while the cargo item with the cargo tag ID "A2087" contains milk cartons. For temperature and humidity-sensitive agricultural produce or dairy products, it may be critical to maintain appropriate humidity and temperature inside the commercial vehicle cargo space. In another example, the cargo item with the cargo tag ID "B1041' contains fragile wooden music instruments. For cargos containing fragile items, it may be critical to minimize excessive g-forces caused by radical acceleration or deceleration of the commercial vehicle in order to prevent breakage or damage to the fragile items. Therefore, linking the cargo content information (409) to each cargo tag ID (401) and its related real-time cargo condition information (405) and real-time location information (407) in the cargo information database enable the one or more cargo condition analytics modules in the cargo condition management system to determine potential or actual damages or endangerment to each cargo item in real-time and retroactive basis.

As shown in FIG. 4, the cargo condition management system, in accordance with an embodiment of the invention, provides delivery service providers and customers a unique ability to gather and link various real-time cargo condition information (405) and cargo location information (407) remotely from the in-vehicle environmental sensors and the in-vehicle OBD unit to detect and determine a potential endangerment, damage, or loss to a particular cargo item in real time. Furthermore, the delivery service providers and the customers can also analyze past records gathered and organized by the cargo information database to probe and discover the causality of damage or loss to the particular cargo item as a retroactive investigational tool.

Figure 5:
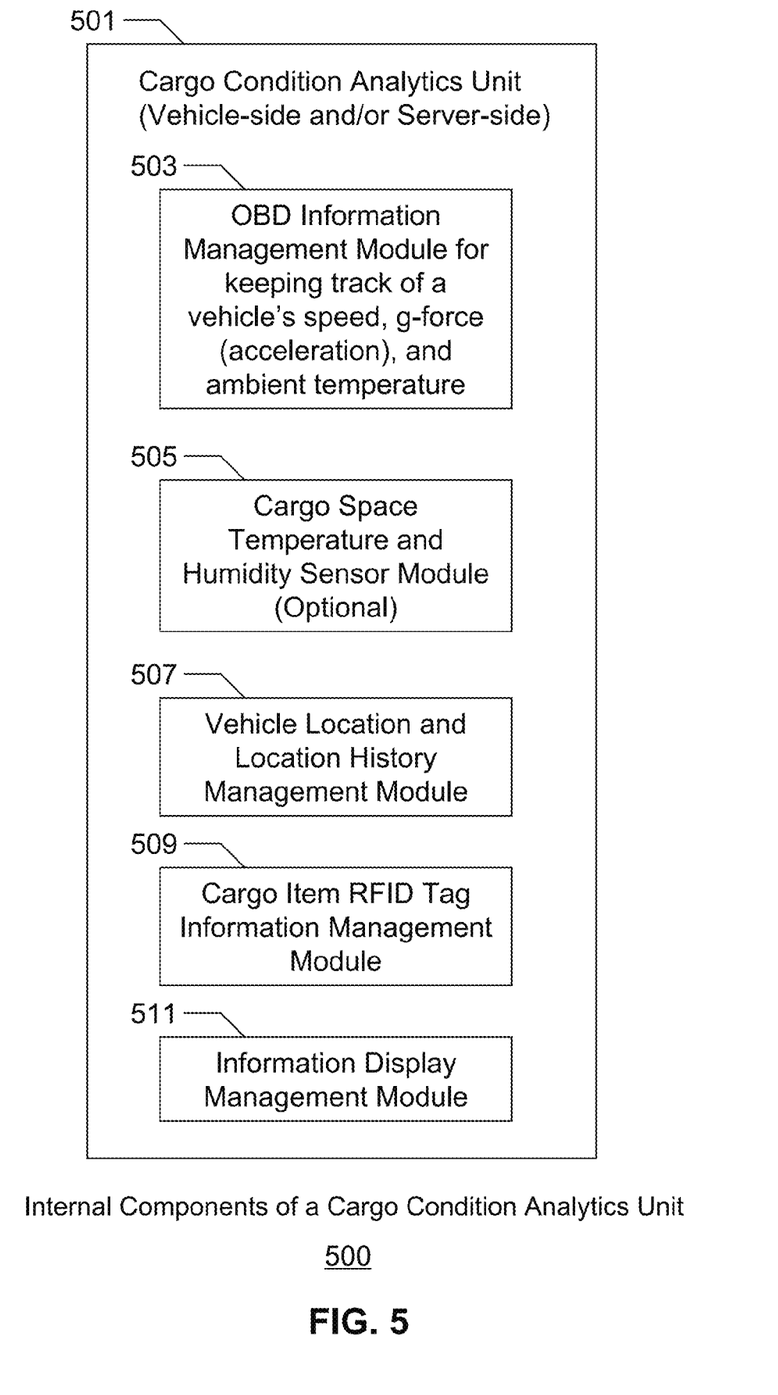
FIG. 5 shows internal components of a cargo condition analysis unit, in accordance with an embodiment of the invention.

FIG. 5 shows internal components (500) of a cargo condition analysis unit (501), in accordance with an embodiment of the invention. The cargo condition analysis unit (501) may be in a vehicle side, a server side, or both, as previously shown and described for elements 119 and 129 in FIG. 1. In a preferred embodiment of the invention, the cargo condition analysis unit (501) comprises an OBD information management module (503) for keeping track of a vehicle's speed, g-force (acceleration and deceleration), and ambient air temperature from a vehicle OBD unit. Other information outputted by the vehicle OBD unit may also be tracked by the OBD information management module (503), if those information are useful in determining cargo transport conditions. An OBD data stream from the vehicle OBD unit, which contains vehicular dynamics and vehicle diagnostic information, can be stored, categorized, and extracted in the OBD information management module (503).

In one embodiment of the invention, the cargo condition analysis unit (501) also includes a cargo space temperature and humidity sensor module (505), which receives, stores, and categorizes cargo space temperature and humidity information relative to time. The cargo space temperature and humidity information is transmitted to the cargo condition analysis unit (501) by in-vehicle environmental sensors inside or near the commercial vehicle cargo space via an OBD data transceiver unit and a data communication network.

The cargo condition analysis unit (501) also includes a vehicle location and location history management module (507). The vehicle location and location history management module (507) is capable of tracking, categorizing, and storing vehicle location and location history information, which may be retrieved from a GPS receiver unit or another location tracking unit. Preferably, the vehicle location and the location history information are combined, time-stamped, and/or time-synchronized with the OBD data stream coming from the vehicle OBD unit. Furthermore, the cargo condition analysis unit (501) also includes a cargo item RFID tag information management module (509), which stores and categorizes cargo tag ID's, cargo owner information, cargo content information, and any other information originating from each RFID tag attached to a cargo item, wherein the fetching of such information from each RFID tag is conducted by a cargo space RFID reader inside a commercial vehicle cargo space that transmits pertinent information to the cargo condition analysis unit (501) via a data communication network.

In the preferred embodiment of the invention, the OBD information management module (503), the cargo space temperature and humidity sensor module (505), the vehicle location and location history management module (507), and the cargo item RFID tag information management module (509) include a "cargo item endangerment" threshold alert level, which can be automatically adjusted and set by the cargo condition analytics unit (501), or manually set by a vehicle monitoring personnel in a remote monitoring station unit. The cargo item endangerment alert threshold is exceeded when one or more data values analyzed by the OBD information management module (503), the cargo space temperature and humidity sensor module (505), the vehicle location and location history management module (507), and the cargo item RFID tag information management module (509) exceed a safety level limit. For example, if the OBD information management module (503) detects an excessive g-force, and the cargo space temperature and humidity sensor module (505) detects an excessive temperature or humidity inside the commercial vehicle cargo space, then the cargo condition analytics unit (501) may determine that the safety level limit is breached, and thus the cargo item endangerment alert threshold is exceeded. Once the cargo item endangerment alert threshold is exceeded, the cargo condition analytics unit (501) may trigger a visual, textual, aural, or multimedia alerts in form of an information display on a screen, an email alert, a phone alert, or another appropriate method of alarm to the vehicle monitoring personnel.

Moreover, the cargo condition analytics unit (501) also includes an information display management module (511). The information display management module (511) is configured to display the monitored cargo-related and cargo transport condition-related information (e.g. 400 in FIG. 4) as well as any cargo item endangerment alerts in real time for the vehicle monitoring personnel or for the remote monitoring station unit. In one embodiment of the invention, the cargo condition analytics unit (501) may be a software unit, which is executed in a CPU and a memory unit of a hardware device, such as system block components (e.g. 200 of FIG. 2) of a cargo condition analytics module, or a computer server. In another embodiment of the invention, the cargo condition analytics unit (501) may be a combination of software units and hardware units that conceptually constitute various components (503, 505, 507, 509, 511) of the cargo condition analytics unit (501). Yet in another embodiment of the invention, the cargo condition analytics unit (501) may be entirely implemented into a semiconductor chip, which makes the cargo condition analytics unit (501) a system-on-chip (SoC) hardware solution.

Various embodiments of the present invention provide several key advantages to conventional transport item tracking methods. One advantage of an embodiment of the present invention is providing a novel cargo condition management system that enables real-time cargo transport condition tracking, communication, and management to capture and provide a detailed record of past and current transport conditions beyond a mere location tracking capability. For example, in one embodiment of the invention, any potential or actual damages, losses, or endangerment to a cargo item can be tracked, detected, and analyzed in real time and retroactively, thus enabling a delivery service provider and a customer to trace and determine a likely reason for damages, losses, or endangerment to the cargo item. This real-time and retroactive traceability of the cargo condition management system, as disclosed in various embodiments of the present invention, may provide unique benefits, such as lowering shipping insurance costs and reducing faulty damage claims or lawsuits, to the delivery service provider and the customer by making the transport process transparent and objectively observable.

Furthermore, another advantage of an embodiment of the present invention is providing a novel cargo condition management system that synchronizes with a vehicle's on-board diagnostics (OBD) unit to correlate the vehicle's various sensory outputs to a cargo item inside the vehicle's cargo space to provide sensory and/or environmental details for cargo transport conditions, such as acceleration, deceleration, location, ambient temperature data, and other vehicle OBD-outputted data.

Moreover, an additional advantage of an embodiment of the present invention is incorporating environmental sensors inside or near a vehicle's cargo space to provide other useful sensory details associated with a cargo item in transit. Yet another advantage of an embodiment of the present invention is providing a remote real-time vehicle OBD monitoring conducted by a delivery service provider or another third party to minimize package content damages during the vehicle transport.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A cargo condition management system with a remote real-time vehicle on-board diagnostics monitoring, the cargo condition management system comprising:
   a vehicle on-board diagnostics unit connected to an engine control unit of a vehicle to record, diagnose, and generate vehicle speed data, acceleration and deceleration data, ambient air temperature data, and other vehicle diagnostics data as a real-time data stream;
   a cargo space radio frequency identification (RFID) reader either directly or indirectly connected to the vehicle on-board diagnostics unit in the vehicle and to a cargo condition analytics module, wherein the cargo space RFID reader further comprises a radio frequency (RF) antenna configured to read cargo-identification data from or write the cargo-identification data to an RFID tag attached to a cargo item in a commercial vehicle cargo space;
   a cargo space humidity sensor and a cargo space temperature sensor installed in the commercial vehicle cargo space, wherein each sensor detects and transmits real-time cargo space sensory readings from the commercial vehicle cargo space to the cargo condition analytics module;
   the cargo condition analytics module either directly or indirectly connected to the vehicle on-board diagnostics unit, the cargo space humidity sensor, the cargo space temperature sensor, and the cargo space RFID reader, wherein the cargo condition analytics module receives the real-time data stream from the vehicle on-board diagnostics unit, the real-time cargo space sensory readings from the cargo space humidity sensor, the cargo space temperature sensor, and the cargo-identification data from the cargo space RFID reader in the commercial vehicle cargo space to synthesize a unique dataset called "real-time cargo transport condition-related data" that fuses the real-time data stream from the vehicle on-board diagnostics unit with the real-time cargo space sensory readings from the cargo space humidity sensor, and the cargo space temperature sensor originating from the commercial vehicle cargo space;
   a cargo information database that accumulates and categorizes the cargo-identification data and the "real-time cargo transport condition-related data" from the cargo condition analytics module by cargo tag identification (ID); and
   a computer server with a CPU and a memory unit that executes a cargo condition analytics unit of the cargo condition analytics module to monitor a safety level limit of the cargo item in the commercial vehicle cargo space in real time, and to generate a cargo endangerment alert to a vehicle monitoring personnel when real-time cargo g-force, humidity, and temperature transport condition parameters derived from the "real-time cargo transport condition-related data" exceed a cargo item endangerment threshold alert level.

2. The cargo condition management system of claim 1, further comprising an on-board diagnostics data transceiver unit in the vehicle and a data communication network to transmit the real-time data stream from the vehicle on-board diagnostics unit and the cargo-identification data from the cargo space RFID reader in the commercial vehicle cargo space to the computer server in a remote monitoring station unit wirelessly.

3. The cargo condition management system of claim 2, further comprising a GPS receiver in the vehicle to transmit the vehicle's real-time location to the remote monitoring station unit wirelessly, wherein the vehicle's real-time location is utilized by the cargo condition analytics module for monitoring the safety level limit of the cargo item in the commercial vehicle cargo space in real time.

4. The cargo condition management system of claim 1, wherein the cargo condition analytics unit in the cargo condition analytics module further comprises a vehicle on-board diagnostics information management module for keeping track of the vehicle speed data, the acceleration and deceleration data, the ambient air temperature data from the vehicle on-board diagnostics unit.

5. The cargo condition management system of claim 1, wherein the cargo condition analytics unit in the cargo condition analytics module further comprises a cargo space temperature and humidity sensor module, a vehicle location and location history management module, and a cargo item RFID tag information management module to monitor the safety level limit of the cargo item in the commercial vehicle cargo space in real time, and to generate the cargo endangerment alert to the vehicle monitoring personnel based on additional real-time cargo transport condition information provided by the cargo space temperature and humidity sensor module, the vehicle location and location history management module, and the cargo item RFID tag information management module.

6. The cargo condition management system of claim 1, wherein the cargo condition analytics unit in the cargo condition analytics module further comprises an information display management module to cause display, on a cargo condition analytics user interface in a remote monitoring station, one or more cargo tag ID's, real-time cargo location information, cargo content information, and cargo transport condition parameters including cargo owner information, current and past humidity and temperature in the commercial vehicle cargo space, and current and past acceleration and deceleration records experienced by the commercial vehicle cargo space, which are categorized by the one or more cargo tag ID's.

7. The cargo condition management system of claim 6, wherein the information display management module of the cargo condition analytics unit in the cargo condition analytics module retrieves information from the cargo information database.

8. The cargo condition management system of claim 1, wherein the cargo condition analytics module is a vehicle-side module, a computer server-side module, or both.

9. The cargo condition management system of claim 1, wherein the vehicle is a truck, a taxi, a van, a train, or an airplane operated and managed by a cargo delivery service provider.

10. The cargo condition management system of claim 1, wherein the cargo-identification data and the "real-time cargo transport condition-related data" from the cargo condition analytics module are retroactively traced and analyzed for discovering specific causes of damages, losses, or endangerments to the cargo item during transport.

* * * * *